United States Patent [19]

Vladkov

[11] Patent Number: 4,980,766
[45] Date of Patent: Dec. 25, 1990

[54] METHOD AND A DEVICE FOR SYMBOL INTRODUCTION IN A PROGRAMME TELEVISION SIGNAL

[75] Inventor: Emil P. Vladkov, Sofia, Bulgaria

[73] Assignee: Bulgarska Televisia Kam Komitet Sa Televisia I Radio, Sofia, Bulgaria

[21] Appl. No.: 307,680

[22] Filed: Feb. 6, 1989

[30] Foreign Application Priority Data

Mar. 14, 1988 [BG] Bulgaria .................................. 83313

[51] Int. Cl.$^5$ ............................................. H04N 5/22
[52] U.S. Cl. ....................................... 358/183; 358/22
[58] Field of Search ................... 358/145, 183, 168, 22

[56] References Cited

U.S. PATENT DOCUMENTS

| 3,465,097 | 9/1969 | Brabon et al. | 358/183 |
| 3,602,646 | 8/1971 | Goldberg | 358/183 |
| 3,936,868 | 2/1976 | Thorpe | 358/183 |
| 4,218,698 | 8/1980 | Bart et al. | 358/22 |
| 4,520,397 | 5/1985 | Hibi | 358/168 |
| 4,827,344 | 5/1989 | Astle et al. | 358/183 |

FOREIGN PATENT DOCUMENTS

| 0000655 | 1/1980 | Japan | 358/183 |
| 0773961 | 10/1980 | U.S.S.R. | 358/22 |
| 1148127 | 3/1985 | U.S.S.R. | 358/22 |
| 1146140 | 12/1975 | United Kingdom | 358/183 |
| 1556811 | 11/1979 | United Kingdom | 358/22 |
| 2038136 | 7/1980 | United Kingdom | 358/183 |
| 2078049 | 12/1981 | United Kingdom | 358/183 |

OTHER PUBLICATIONS

Michael Cox-England-Dgr No. C6368 A3 -Secam Subtitle Inserter-Technical Manual-6.12.83-Issue Blk. Oiag PPC.
Robert Bosch GmbH-Dortmund 3.3.1981-Zeichenzusatzer XC ZV 63A, Dokumentation FDL60 A 4-131-82-00—SK.
Michael Cox-England-Dgr. No. C6368 A3-Secam Subtitle Inserter-Technical Manual-6.12.83-Issue Blk. Oiag PPC.
Robert Bosch GmbH-Dortmund 3.3. 1981-Zeichenzusatzer XC ZV 62A Dokumentation FLD60 A 4-131-82-00-SX.

Primary Examiner—James J. Groody
Assistant Examiner—Daniel E. Harvey
Attorney, Agent, or Firm—Herbert Dubno

[57] ABSTRACT

A method of and an apparatus for introducing symbols into a television program signal detects the instantaneous brightness $Y_A$ of a television program signal and before mixing that signal with a symbol signal to achieve a brightness E of the image, shapes the symbol signals so that it has a brightness level $B \leq (E - Y_A)$ where E is the brightness of the symbol in the image. Only then is the symbol with brightness level B added to the television signal A to form the mixed or added signal B+A.

1 Claim, 12 Drawing Sheets

METHOD AND A DEVICE FOR SYMBOL INTRODUCTION IN A PROGRAMME TELEVISION SIGNAL

Field of the Invention

This invention relates to a method and apparatus for symbol introduction in a television program signal applicable in studio equipment, applied television and computer graphic technology for the introduction of letters, digits and other graphic symbols into the visible part of a television picture.

In U.K. Patent document GB No. 3 078 049 there is described a well-known method of symbol introduction into a television program signal where the program signal and the symbol signal are summed. The program signal is multiplied in advance with the fraction of the symbol signal complemented to a unit. The symbol signal is reduced before summation by a constant value.

The apparatus for symbol introduction into a television program signal using this method includes a mixer to which the source of a television program signal is connected across its first input across an analog multiplier, the symbol generator output is connected to a second input of the system by a voltage divider, and the output of the apparatus represents the final output.

A summation inverter is connected to the second input of the analog multiplier, potential −1 being connected to one of its inputs while the symbol signal is connected to the other input by a second voltage divider. The disadvantage of this method and apparatus for symbol introduction into a television program signal is the quality deterioration of the television program signal after the symbol introduction as a consequence of the non-linearities accompanying the signal multiplication.

Another disadvantage of this method and apparatus for symbol introduction is their inapplicability to a SECAM system program signal due to the fact that in the process of pre-processing of the program signal before summation there is interference with the level and the carrier frequency for the color which is inadmissible for that system.

There is yet another method for symbol introduction into a television program signal which is applicable for SECAM signals (Michael COX-ENGLAND-Dgr No. C6368 A3 SECAM SUBTITLE INSERTER-TECHNICAL MANUAL-6.12.83 ISSUE BLK. OIAG PPC) where the program signal is partially decoded to brightness and consecutive color difference video signals and, after brightness and color contrast corrections in conjunction with the symbol signal, is coded according to SECAM. The coded signal is reswitched with the input program signal time levelled for the symbol signal carrier rows.

The symbol introduction apparatus for carrying out this method has the signal connected to a partial SECAM decoder and across a time equalizing unit to one of the signal inputs of a commutator the output of which is a device output. The partial decoder outputs are connected across a correction unit to a second switch across the other input to which is connected the output of a DC level restoration unit. The control input of the second switch is connected to the symbol generator output. The output of the same switch is connected to the second signal input of the first commutator, while its control input is connected to the frame box-processor output.

A disadvantage of the second method and apparatus for symbol introduction in a television program signal is the lower quality of the program signal and the introduced symbols as a result of the coding/decoding processes.

Another reason for the disadvantages of this latter method and apparatus is the need for large time equalizations related to phase frequency program signal distortions.

A further disadvantage of the apparatus used is its limited ability to operate a program signal by a single standard, e.g. SECAM.

Yet a third apparatus for symbol introduction into a television program signal (Robert Bosch GmbH-DORTMUND 3.3.1981 ZEICHENZUSATZER XC ZV 63A DOKUMENTATION FDL60 A 4-13182-00-SX) is knoWn containing an adder the first input of which is connected to the output of a DC level fixation unit, its second input being connected to the output of a summation unit the first input of which is connected to the output of the DC level fixation unit across a low-pass filter, and its second input connected to the output of a symbol generator. The adder output is an output of the device. The first adder input is connected to the output of the DC level fixation unit across a band filter passing the color signal. The summation unit is connected to the second adder input across a level limiter. The summation unit function (limiter) in the symbol introducing device in the television program signal is performed by an amplitude priority switch of its input signals.

It is a disadvantage of this latter introduction apparatus that it possesses a poor quality of the output television program signal caused by the frequency and phase distortions accompanying the filtration of the brightness signal and the color signal.

Another disadvantage of this signal symbol introduction apparatus is the limited symbol contrast in the picture in the parts with higher brightness due to the lack of symbol polarity adaption to the brightness of the program signal.

OBJECT OF THE INVENTION

It is the object of this invention to provide an improved method of and apparatus for symbol introduction in a television program signal which will guarantee unaltered quality of the television program signal after the symbol introduction regardless of the television program signal coding standard and which is also applicable to signals of the SECAM system.

SUMMARY OF THE INVENTION

The object is achieved by a method for the introduction of symbols in a television program signal where the program signal and the symbol signal are summed. Before summation the symbol signal is shaped by level in such a way that its value is always smaller than or equal to the brightness level difference of the symbol injected into the picture and the instantaneous program signal brightness level. The brightness level of the symbol inserted into the picture can be constant or can alter depending on the instantaneous brightness level of the program signal.

The apparatus for symbol introduction into a television program signal for carrying out the method comprises a mixer to the first input of which is connected to a complex television signal source. The output of a symbol generator is connected to its second input, and the output of the mixer is an output of the apparatus. The program signal connection to the first mixer input is made across a unit for the restoration of the DC component. The symbol generation output connection to the second adder input is made across a memory, a bipolar pulse shaper and a low-pass filter connected in series. The symbol generator output is also connected to the control input of a bipolar pulse shaper and to the control input of the logical signal shaper, the output of which is connected to the memory data input, and its input being connected to the output of the DC component restoration unit across a brightness signal divider while its second input is connected to the output of a selectable reference voltage unit.

In an alternative of the symbol introduction device, this device comprises an adder, a first input of which is connected to the output of a DC level fixing unit. Its second input is connected to the output of a summation unit whose first input is connected to the output of the DC level fixing unit across a low-pass filter, and whose second input is connected to the output of a symbol generator. The output of the adder is an output of the device.

The input of the DC level restoration unit is an input of the device and is supplied with the television program signal. The connection of the symbol generation output to the second input of the summation unit is made across a calibration unit. The summation unit comprises two differential amplifiers the different-name inputs of which are interconnected forming a first and a second input, respectively, of the summation unit, and their outputs are outputs of the summation unit and are connected to the second input of the adder across a pulse shaper and a second low-pass filter connected in series. The connection of the DC level fixing unit output to the first input of the adder can be made across the time equalization unit. The connection of the outputs of the summation unit to the inputs of the pulse shaper can be made across limiters of positive, or negative polarity, respectively.

The pulse shaper, in the first alternative of the apparatus, includes a level comparator both inputs of which are the inputs of the shaper. Its pulse input is connected to the symbol generator output and its output is connected to the control input of an electronic switch, the output of which is an output of the shaper. The switch signal inputs are connected to the shaper inputs.

In another implementation of the second embodiment the pulse shaper includes a comparator the first input of which is connected to a source of reference voltage, whereas its second input is connected to the output of the first low-pass filter and is the third input of the shaper, the first and second inputs of which are connected to the two signal inputs of the electron switch, the control input of which is connected to the comparator output and its output is an output of the shaper.

In a third alternative the symbol introduction apparatus comprises an adder, the first input of which is connected across a DC level fixation unit and a time equalizing unit, connected in series, to a source of program signal, its second input is connected to the output of an electronic switch, and its output is an output of the device. The electronic switch control input is connected to the output of a level comparator the input of which is connected to the DC level fixing unit output across a low-pass filter.

The other input of the level comparator is connected to a source of reference voltage. The connection of the low-pass filter output to the comparator input is made across a DC level translator. The low-pass filter output is connected to the inputs of the second and third translators of the DC level across an averter. The outputs of the second and third DC level translators are connected to the two inputs of the electronic switch. The latter's output is connected to one of the inputs of a second electronic switch, the other input of which is grounded. Its control input is connected to the symbol generator output and its output is connected to the second input of the adder.

In a fourth alternative of the device the program signal is applied across a DC level fixing unit and connected in series with a time equalizing unit to one of the inputs of an additive mixer the output of which is an output of the device. The DC level fixing unit output is simultaneously connected across a low-pass filter, an inverter and a white level translator in series to one of the inputs of an electronic commutator. The inverter output is connected across a black level translator to the second input of the electronic commutator. The latter's output is connected to one of the inputs of a second electronic commutator, the other signal input of which is at neutral potential. The output of the second electronic commutator is connected across a supplementary low-frequency filter to the second input of the additive mixer. The control input of the first electronic commutator is connected, across a key signal shaper for graphic symbols, to the output of a character generator. The control input of the second electronic commutator is connected to the output of the character generator across a key signal shaper on a background neutral field.

The graphic symbol key signal shaper may contain an Exclusive Or logic, the first input of which is an input of the shaper. Its second input is connected to the shaper input across a delay line, and its output is an output of the shaper. The background neutral field key signal shaper is provided as a delay line with a time-lag $\frac{1}{2}$ of the time lag of the delay line of the graphic symbol key signal shaper.

In another implementation of the fourth alternative, the graphic symbol key signal shaper has a delay line and an inverter connected in series between its input and output. The background neutral field key signal shaper is linear.

In a third implementation of the fourth alternative, the graphic symbol key signal shaper is an inverter, and the background neutral field key signal shaper is a delay line.

According to this invention the unaltered quality of the program signal after the introduction of the symbols is an advantage of the method and the device for the introduction 15 of symbols in a program television signal, and it is due to the fact that the program signal is not subjected to the nonlinear or frequency processing in the symbol introduction.

Another advantage is the ability of the method and device to be applied to all color standard signals, including SECAM signals.

Yet a third advantage of the method and apparatus for symbol introduction into a program signal according to this invention is the securing of maximum contrast of the introduced symbols at different brightness characteristic of the program signal, due to the adaptive determination of the brightness level of the symbols introduced in the picture to the current brightness of the program signal. It is possible by this type of adaptability to acquire a symbol transparency effect for the program signal.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

The method for the introduction of symbols into a television program signal sums the program signal and the symbol signal. Before summation the symbol signal is shaped in such a way that its value B is always smaller than or equal to the brightness level difference E of the symbol into the picture and the momentary brightness level VA of the program signal as given in the expression $B \leq E - VA$.

Figure 1:
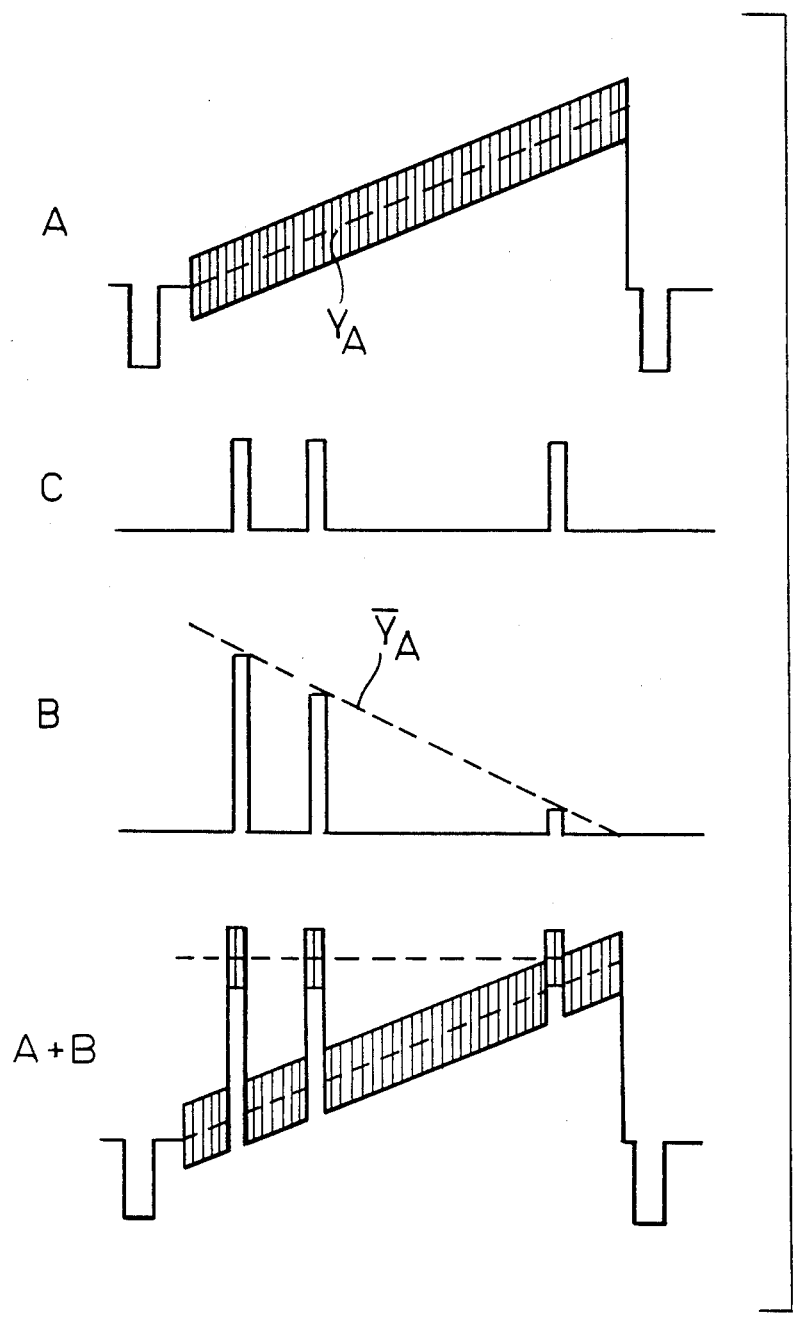
FIG. 1 is a timing diagram of the signals illustrating the method of symbol introduction into the program signal where the brightness level of the symbol transmitted into the picture is constant and equal to the maximum brightness.

The brightness level of symbol E inserted into the picture (image) in the first embodiment of the method for symbol introduction into television program signal (FIG. 1) is constant and equal to $VA_{max}$.

In the second embodiment of the method of symbol introduction into the television program signal (FIG. 2), the brightness level E of the symbol transmitted into the picture varies depending on the instantaneous brightness level of the program signal VA. The brightness level of the symbols inserted into the picture takes two values: $E = VA_{max}$ and $E = 0$, depending on the brightness signal level in comparison with a constant level selected between the maximum and minimum value of the brightness signal VA (not shown in FIG. 2). As a result, the symbols in the light zones of the picture are transmitted by low brightness level and by high brightness level in the dark pictures zones.

The method can be described by the generalized expression $V_o = V_a - V_c(k - V_a)$, (2) where
  $V_o$ is the brightness signal level after summation,
  $V_a$ is the brightness signal level before summation,
  $V_c$ is the graphic signal level
  k is a coefficient determining the brightness level of the symbol transmitted into the picture which can take values between 0 and 1 (0 for black level-)% brightness, 1 for white level-100% brightness).

Figure 3:
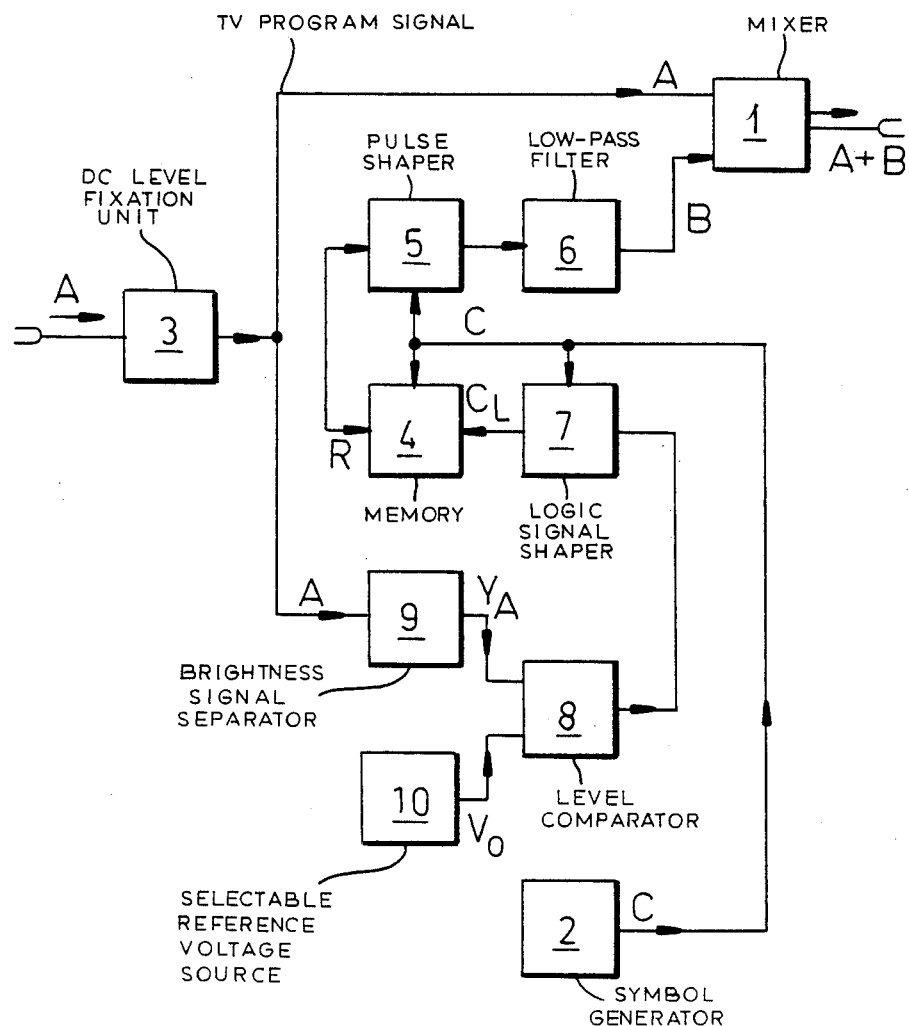
FIG. 3 is a block diagram of the symbol introduction apparatus for symbol introduction into television program signal.
Figure 4:
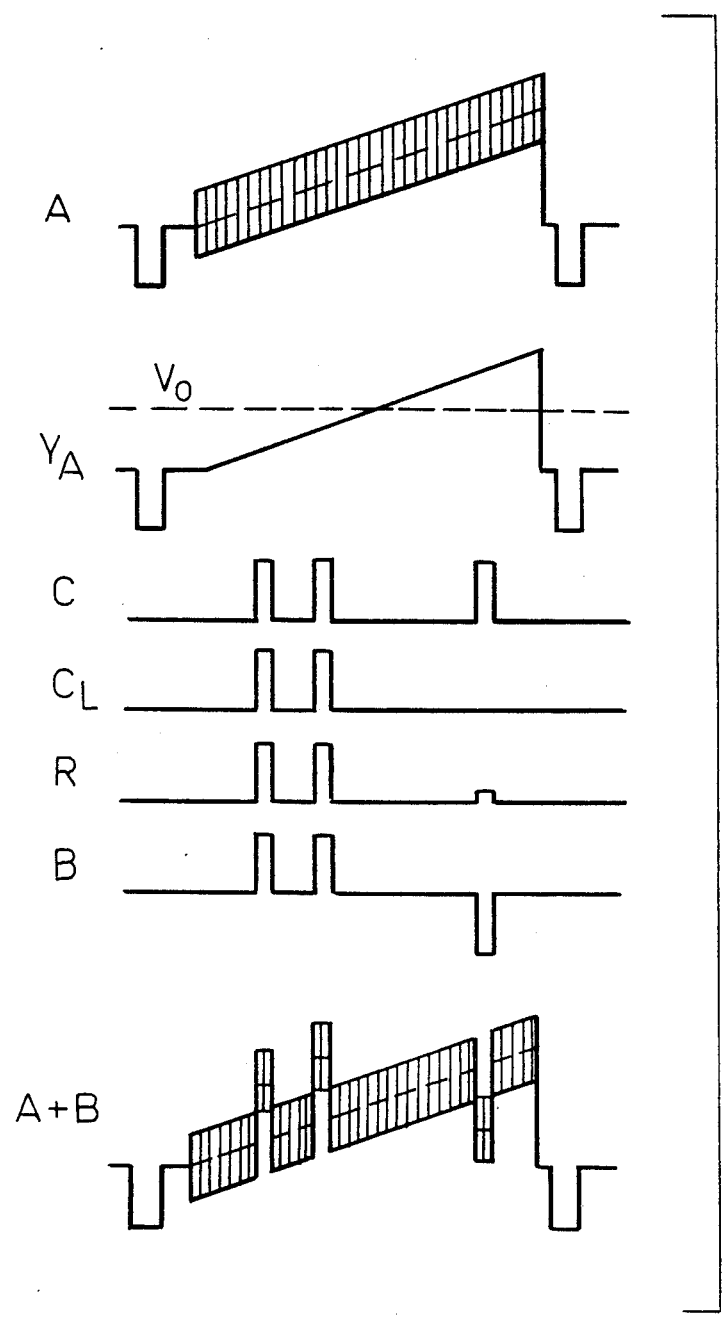
FIG. 4 is a timing diagram of the signals at different points of the device, shown in FIG. 3.

The symbol introduction device (FIG. 3) for a television program signal for carrying out this method, comprises a mixer 1 across the first input of which is connected the television program signal source A (FIG. 4). A symbol generator 2 is connected to its second input. The mixer output is the device output. The connection of program signal A to the first input of mixer 1 is made across a DC level fixation unit 3. The connection of symbol generation 2 to the second input of mixer 1 is made via memory 4, bipolar pulse shaper 5 and low-pass filter 6 connected in series. The symbol generator 2 output is also connected to the control input of the bipolar pulse shaper 5, the control input of the logical signal shaper 7 the output of which is connected to the information input of memory 4, and its input connected to the output of level comparator 3. A first input of the level comparator 8 is connected to the output of the DC level fixation unit 3 across separator 9 of the VA brightness signal, its second input being connected to the output of the $V_o$ selectable reference voltage unit 10.

Figure 2:
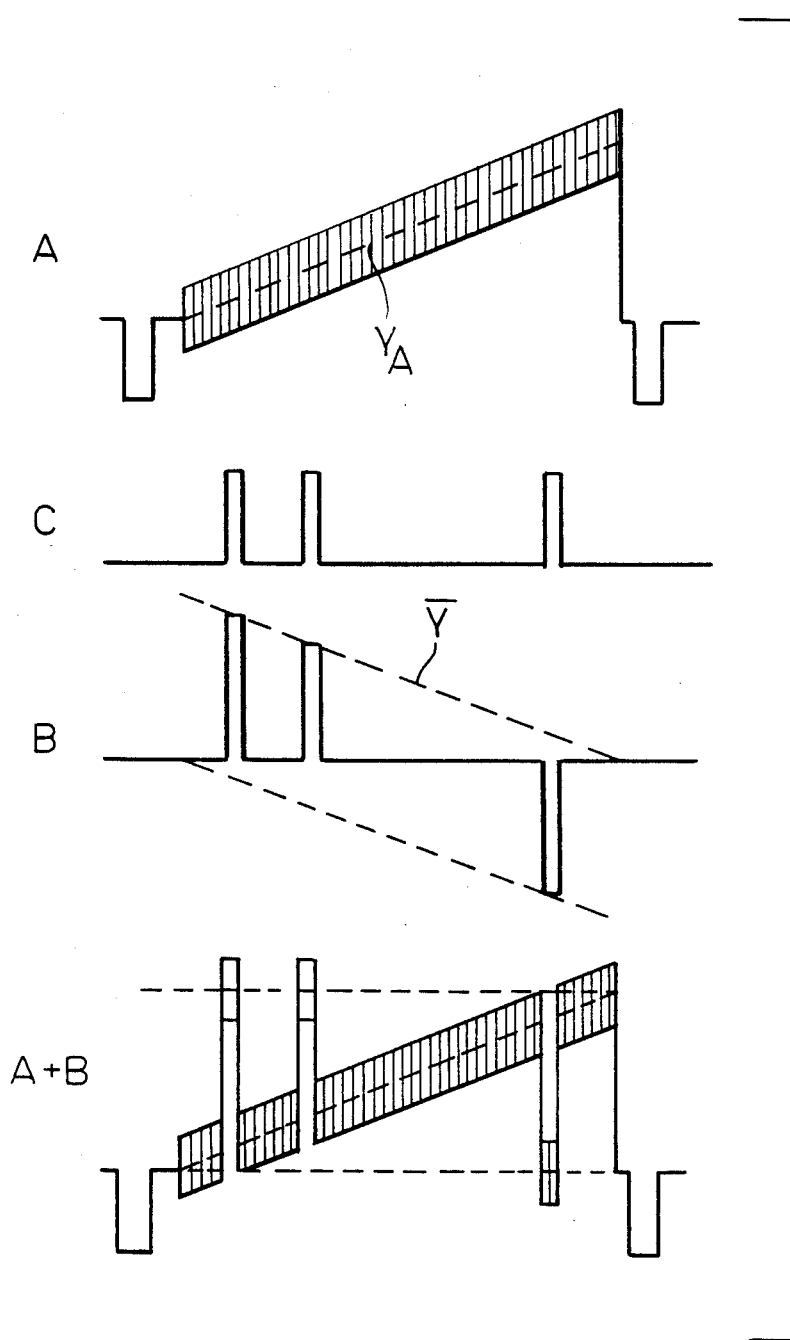
FIG. 2. is a signal timing diagram illustrating the method of symbol introduction into the program signal where the brightness level of the symbol transmitted in the picture is alternating depending on the instantaneous program signal brightness level.
Figure 5:
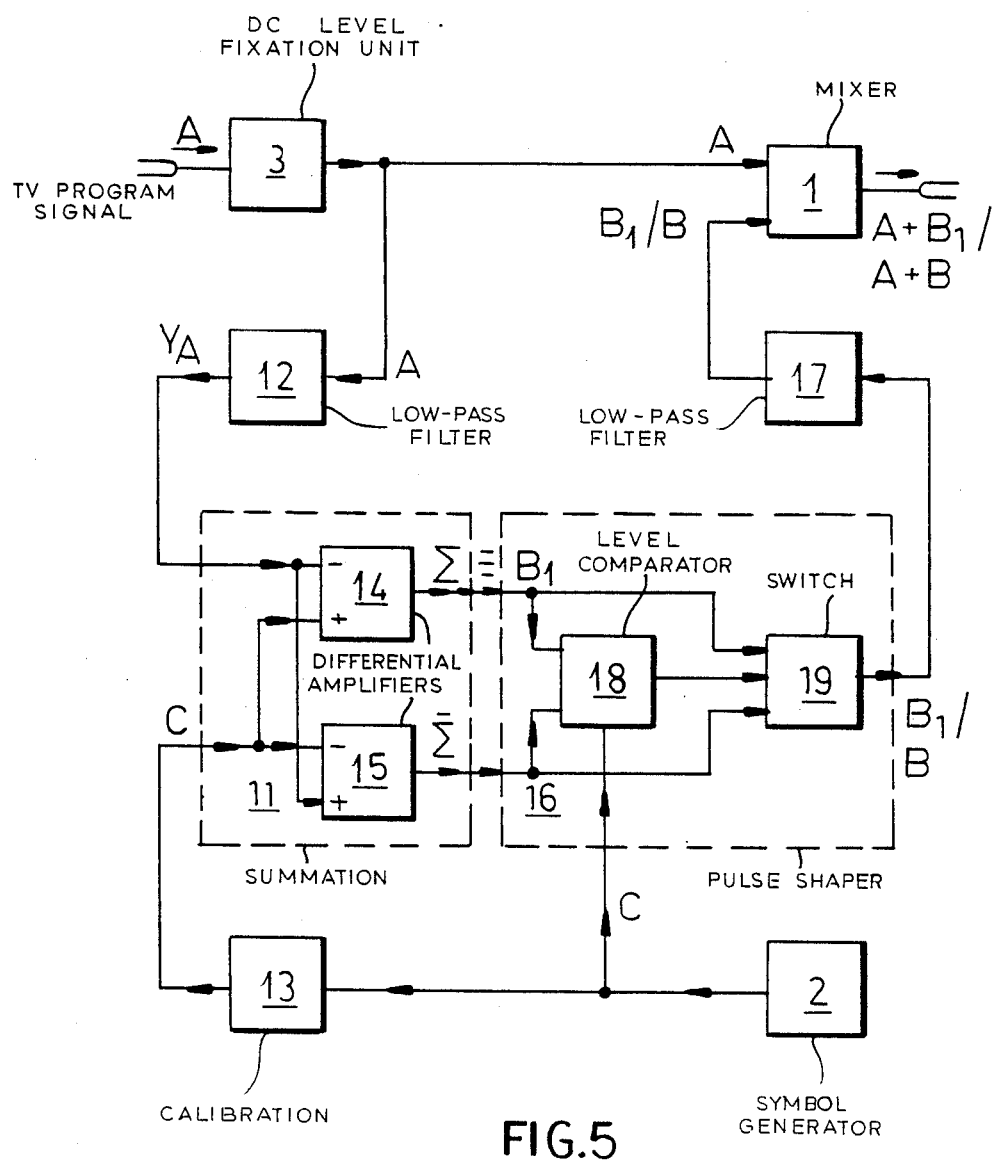
FIG. 5 is a block diagram of a second embodiment of the apparatus.
Figure 6:
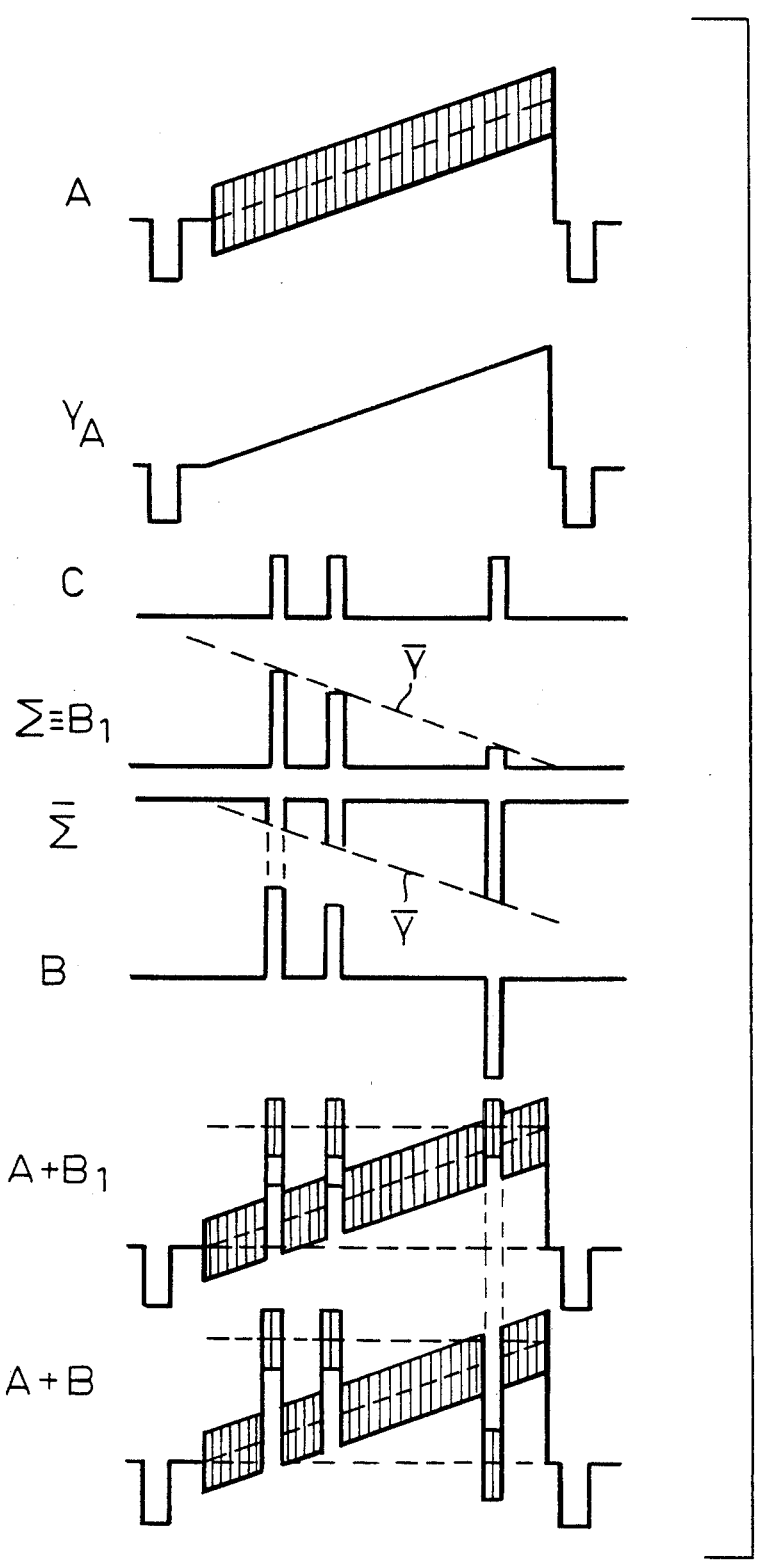
FIG. 6 is a timing diagram of the signals at different points in the block diagram of FIG. 5.

The other device for symbol introduction in a program television signal (FIG. 5) contains as mixer 1, the first input of which is connected to the output of the DC level fixation unit 3. Its second input is connected to the output of a summation unit 11, the first input of which is coupled to the output of the DC level fixation unit 3 across a low-pass filter 12, its second input connected to the output of symbol generator 2. The output of mixer 1 is an output of the device. The input of the DC level fixation unit 3 is the input of the device and is supplied by television program signal A (FIG. 2). The connection of the symbol generator output to the second input of the summation unit is effected across calibration unit 13. The summation unit 11 is composed of two differential amplifiers 14, 15 the inputs of different signs of which are interconnected forming the first and second inputs, respectively, of the summation unit 11. Their outputs are outputs of summation unit 11 and are coupled to the second input of mixer 1 across pulse shaper 16 and a second low-pass filter 17 connected in series. The pulse shaper 16 has a level comparator 18, the two inputs of which are the inputs of shaper 16 Its pulse input is connected to the output of the symbol generator 2; its output is connected to the control input of switch 19 the output of which is the output of shaper 16. The signal inputs of switch 19 are connected to the inputs of shaper 16.

Figure 7:
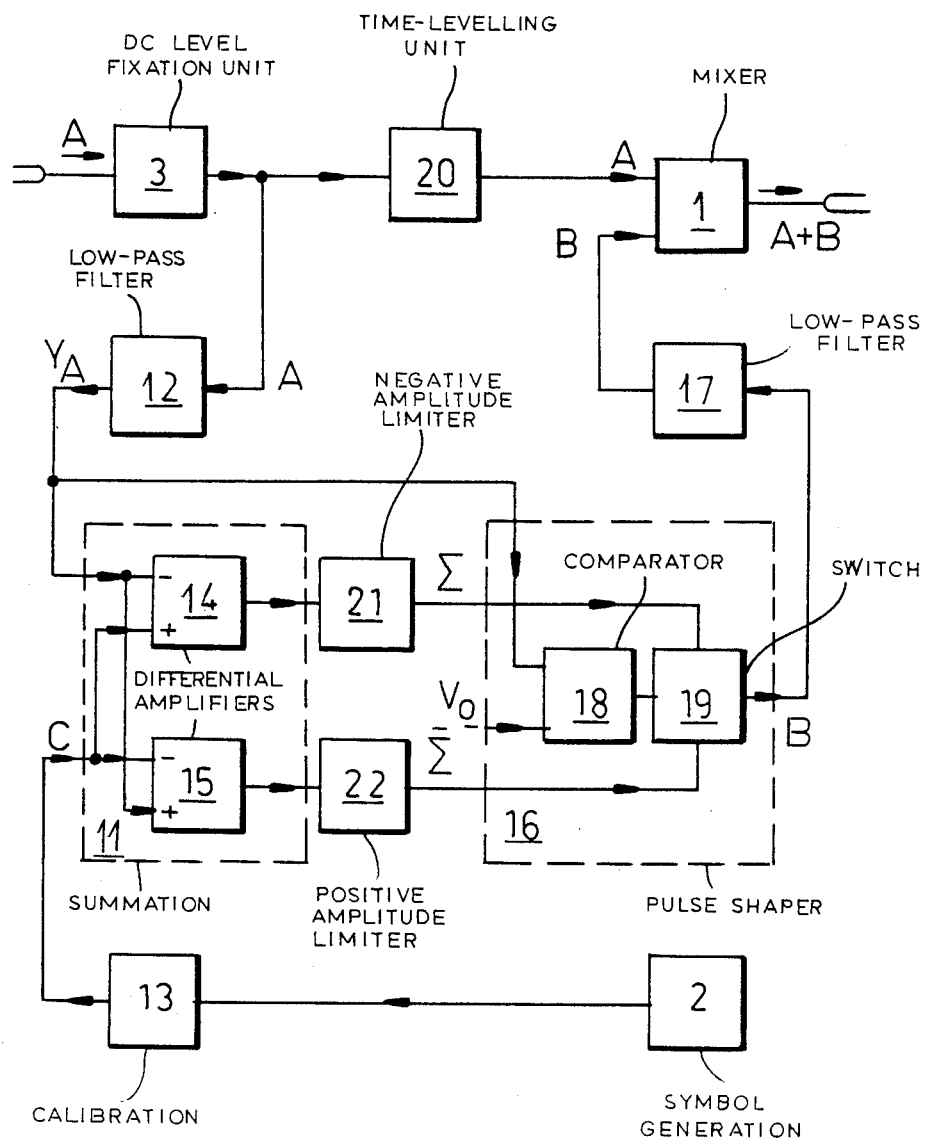
FIG. 7 is a block diagram of a variant of the second embodiment.

In the second alternative of the device for symbol introduction into a program signal (FIG. 7) the connection of the output of the DC level fixation unit 3 to the first input of mixer 1 is made across a time-levelling unit. The connection of the output of summation unit 11 to the inputs of pulse shaper 16 is made across amplitude limiters of negative 21 and positive 22 polarities. The pulse shaper 6 includes a comparator 18 the first input of which is connected to a $V_o$ reference voltage source; its second input is connected to the output of the first low-pass filter 12 being the third input of shaper 16 the first and second inputs of which are connected to the inputs of switch 19 the control input of which is connected to the output of comparator 18, and its output being an output of shaper 16.

In a third alternative, the symbol introduction device for a television program signal (FIG. 3) has mixer 1, the first input of which is connected across DC level fixation unit 3 and time-levelling unit 20 is connected in series to a source of television program signal A. Its second input is connected to the output of an electronic switch 21, and its output is the output of the device. The control input of electronic switch 21 is coupled to the output of level comparator 22 the input of which is connected across a low-pass filter 12 to the output of the DC level fixation unit 3. The outer input of the level comparator 22 is connected to a source of reference voltage $U_o$. The connection of the output of low-pass filter 12 to the signal input of comparator 22 is made across a DC level translator 24. The second output of the low-pass filter 12 is coupled to the inputs of a second DC level translator 25 and a third DC level translator 26 across inverter 27. The outputs of the second and third DC level translators 25 and 26 are connected to the two inputs of electronic switch 21 the output of which is connected to one of the inputs of a second electronic switch 28, the other input of which is grounded, and its control input is connected to the output of the symbol generator 2, its output being connected to the second input of mixer 1.

Figure 10:
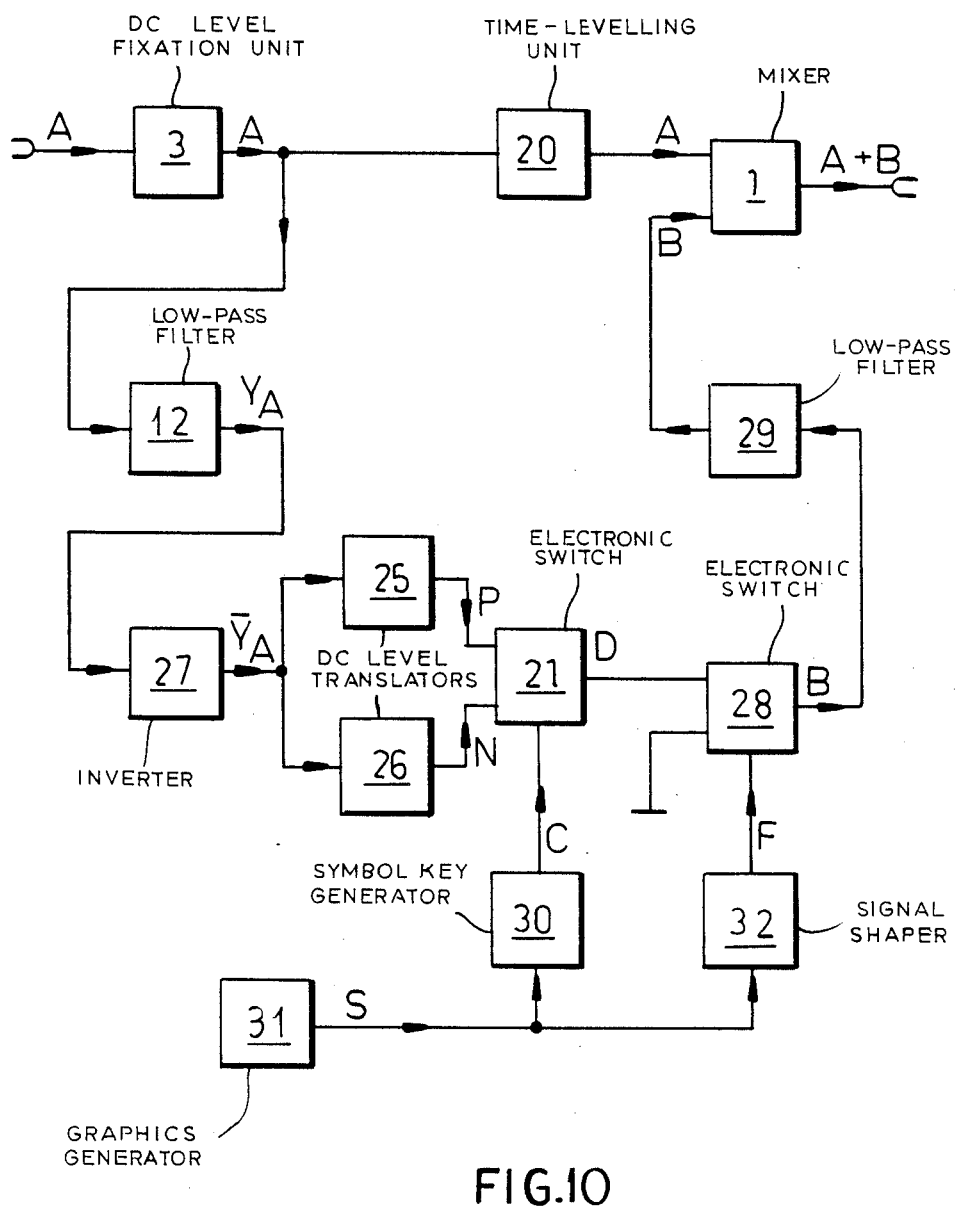
FIG. 10 is a block diagram of an apparatus designed for sub-titling.

In the subtitles alternative in FIG. 10 the program signal A is connected across a DC level fixation unit 3 and a time-levelling unit 20 connected in series to one of the outputs of an additive mixer 1, the output of which is an output of the device. The output of the DC level fixation unit 3 is simultaneously connected across a low-pass filter 12, inverter 27 and white level to zero level DC level translator 25, connected in series to one of the inputs of an electronic commutator 21. The output of inverter 27 is connected across a level black to zero level DC level translator 26 to the other input of the same electronic commutator 21 the output of which is connected to one of the signal inputs of a second electronic commutator 28, the other signal input of which is connected to the neutral potential. The output of the second electronic commutator 28 is coupled across a supplementary low-pass filter 29 to the second input of the additive mixer 1. The control input of the first electronic commutator 21 is connected across graphic symbol key signal shaper 30 to the output of a graphic information generator 31. The control input of the second electronic commutator 28 across background neutral field key signal shaper 32, for neutral contrast symbols boxing, respectively to the output of the graphic information complex generator 31.

There are several alternatives for the implementation of the shapers.

Figure 12:
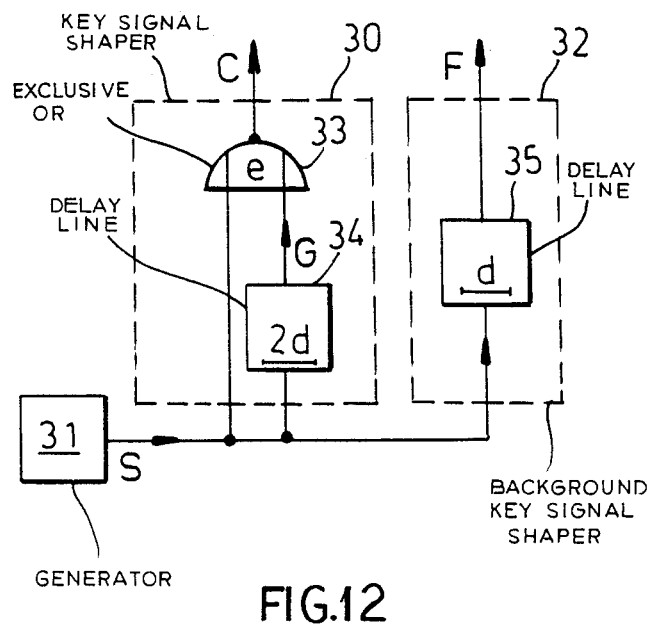
FIG. 12 is a circuit diagram of an alternative of an implementation of shaping units.

In the first embodiment (FIG. 12) the graphic symbol key signal shaper 30 is made of Exclusive Or 33, the first input of which is directly coupled, and its second input across delay line 34 to the input of shaper 30. The output of Exclusive Or 33 is an output of the shaper. The background neutral field key signal shaper 32 is implemented as a second delay line 35, the delay time d of which is ½ of that (2d) of the first delay line 34.

Figure 14:
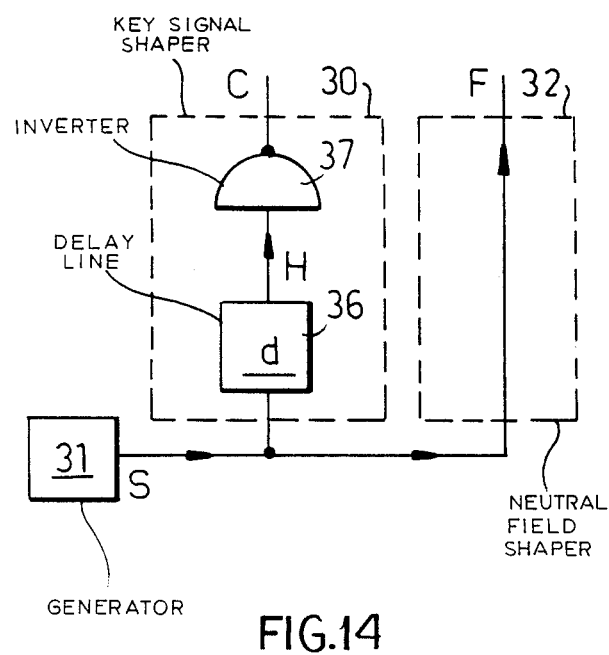
FIG. 14 is a diagram of a second alternative of the shaping units.

In the second embodiment of the shapers (FIG. 14) the graphic symbol key signal shaper 30 contained a delay line 36 and an inverter 37 connected in series between its input and output. The background neutral field key signal shaper 32 is linear.

In the third shaper (embodiment illustrated) the graphic symbol key signal shaper 30 is an inverter, and the background neutral field key signal shaper 32 is a delay line.

In the operation of the device shown in FIG. 3, the program signal A restored by the DC level in the DC level fixation unit 3 is filtered by the color carrier in the YA brightness signal separator 9. Furthermore, only the brightness carrier YA of program signal A reaches the input of the level comparator 8 and is compared with the selectable reference level $V_o$. The signal produced at the output of comparator 8 is inverted in the logical signal shaper 7 by means of the pulses of signal C from the output of the symbol generator 2 into a logical pulse signal $C_L$. For YA brightness values which are below the selected level VO, the logical signal $C_L$ has a high level, and low level for values above the selected level $V_o$. The logical signal $C_L$ containing information about the level of program signal A during the time of the C pulses of the symbol inverted in this way are recorded with the clock of the same pulses C into memory 4 during the time of the fields. The organization of memory 4 allows, during the recording, to read the information recorded in the preceding field. The information recorded in the preceding field carried by logical signal $C_L$ is updated across the output of memory 4. Memory 4 is designed as a stabilization buffer for the results of the comparison of brightness signal YA during the symbol pulse signal C. The logical signal from the output of memory 4 is inverted into a bipolar pulse signal of constant levels. The positive pulses can have the same level with the negative ones, provided that the comparison level $V_o$ corresponds to 50% of the brightness level. In another selection of the level of comparison it is necessary that the levels across the output of the bipolar pulse shaper 5 should be in compliance with the condition supplied in expression (1). It is possible that the positive and negative values of the pulses, or the comparison level of the brightness signal $V_o$, respectively, should be complied with the Y-characteristic of vision in order to have maximum contrast effect in introducing the symbols in the image (picture).

The signal across the output of shaper 5, shaped by polarity and amplitude, is filtered as to its components in the field of the color carrier and above it in the low-pass filter 6 which prevents any side effects of the Cross-Color type and the like. The shaped and filtered B signal is additively mixed with the input program signal in mixer 1, across the output of which is produced the result A + B which is the output signal of the device for symbol introduction in a television program signal. When condition (1) is observed this signal is always in the modulation brightness limit at maximum optimized introduced symbol contrasts.

The symbol introduction into a television program signal (FIG. 5) is effected as follows:

Program signal A, restored with the DC level in the fixation unit 3 is filtered by the color carrier in the low-pass filter 12. At the latter's output, the brightness component YA of input signal A is produced. Signal C from the output of the symbol generator 2 is calibrated in level by calibration unit 13 across the output of which the signal has the shape of the pulses of symbols C but its level is equal to the magnitude of the brightness signal $Y_{Amax}$. The calibration pulse of the symbol C signal are summed in the summation unit 11 by a positive and negative sign with its corresponding in time brightness signal YA with a negative sign, or positive sign, respectively, by means of differential amplifiers 14, 15. Signals of positive polarity d are formed across the outputs of the summation unit filling up the level of the brightness signal YA to level white ($Y_{Amax}$)

$$\Sigma = Y_{Amax} - Y_A$$

and signals of negative polarity d having pulse level equal to the level of the brightness signal YA with opposite polarity $$\Sigma = -Y_A$$

Signals $\Sigma$ and $\Sigma$ across the output of summation unit 11 have values differing from zero only when there are signals of symbol C secured by the mode of the differential amplifiers 7, 8. The pulse shaper 16 is designed to select and pass one of the two input pulses across its output. This is effected by the comparison of the levels of pulse signals $\Sigma$, $\Sigma$ in comparator 18, pulse controlled by the signals of symbols C. Comparator 18 output level controls the state of switch 19 during the time of symbol C signal. Signals B2 from output signals $\Sigma$ or $\Sigma$ of summation unit 11 are produced across the output of shaper 16, selected by level higher than 50% $Y_{Amax}$. In the second low-pass filter 17 the high frequency components of frequencies limiting the frequency spectrum of the color signal are filtered in order to avoid the cross brightness distortions, called cross-color, as a result of the effect of the fronts of pulse signals B2. Across the second input of adder 1, signal B2 has a value and frequency spectrum which satisfy a requirement for mixing with the program signal in order to produce an end product within the boundaries of the limited brightness magnitude and with no penetration of the introduction symbol signal into the color signal spectrum. For the symbol signals introduced in the output signal the level is $$A + B2 = Y_{Amax}, \text{ or } A + B2 = 0,$$

depending on the instantaneous brightness value.

It is also possible to make use of only one differential amplifier, e.g. in summation unit 11. Its output signal $\Sigma = B1$ is the sole signal for additive mixing in mixer 1. In that case the symbols are always presented by maximum brightness. An analog presentation of symbols of minimum brightness is also possible by using the other differential amplifier 15. The operation of the device in FIG. 7 differs in certain features:

It is necessary that calibration unit 13 of the symbols C signals should exceed the magnitude of the brightness signal $Y_{Amax}$ by at least 43% in accordance with the synchronous pulse in the brightness signal and the limitation of negative pulses $\Sigma$. Positive pulses of level from $Y_{Amax}$ to 0 are produced across the output of the negative polarity limiter 21 in case of an adequate shifting of the DC levels of differential amplifier 14, in the summation unit (in the negative region of the first differential amplifier, and in the positive region of the second differential amplifier of the second (15) and a level of the calibration signal C, corresponding to this shifting, and across the output of the positive polarity limiter 22—with a level ranging from 0 to $Y_{Amax}$ when the brightness signal is changed from level black to level white.

Another distinction is the control of comparator 18 by the level of the brightness signal $Y_A$, compared continuously with reference voltage $V_o$. The brightness level can be shifted by an adequate selection of reference voltage $V_o$, where the brightness changing occurs—level black/level white for the symbols in the picture. In a precision execution of the device for symbol introduction into a television program signal A, the latter is transmitted to the first input of the adder 1 by means of a time-levelling unit 20. The latter is designed to retain program signal A for a time equal to the summation group time of the two low-pass filters 12 and 17. On the precision of this time equalization shall depend in what frequency range shall be effected the precision introduction of the symbols for the whole dynamic range of the brightness signal. For the European standards this frequency range is within 0 to 3.4 MHz which satisfies the precision of symbol introduction for the real signal statistics. In these cases the time constant of the time-levelling unit is of the order to 200 ns.

Figure 8:
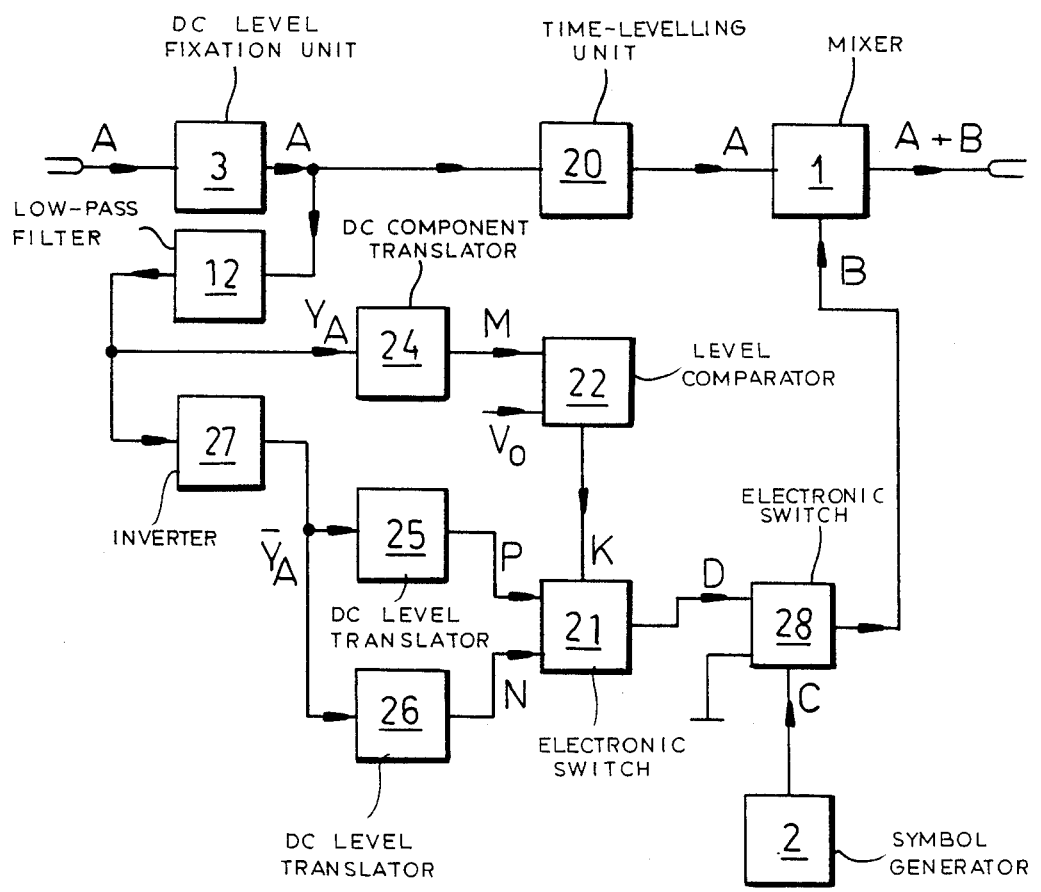
FIG. 8 is a block diagram of a third embodiment of the apparatus.
Figure 9:
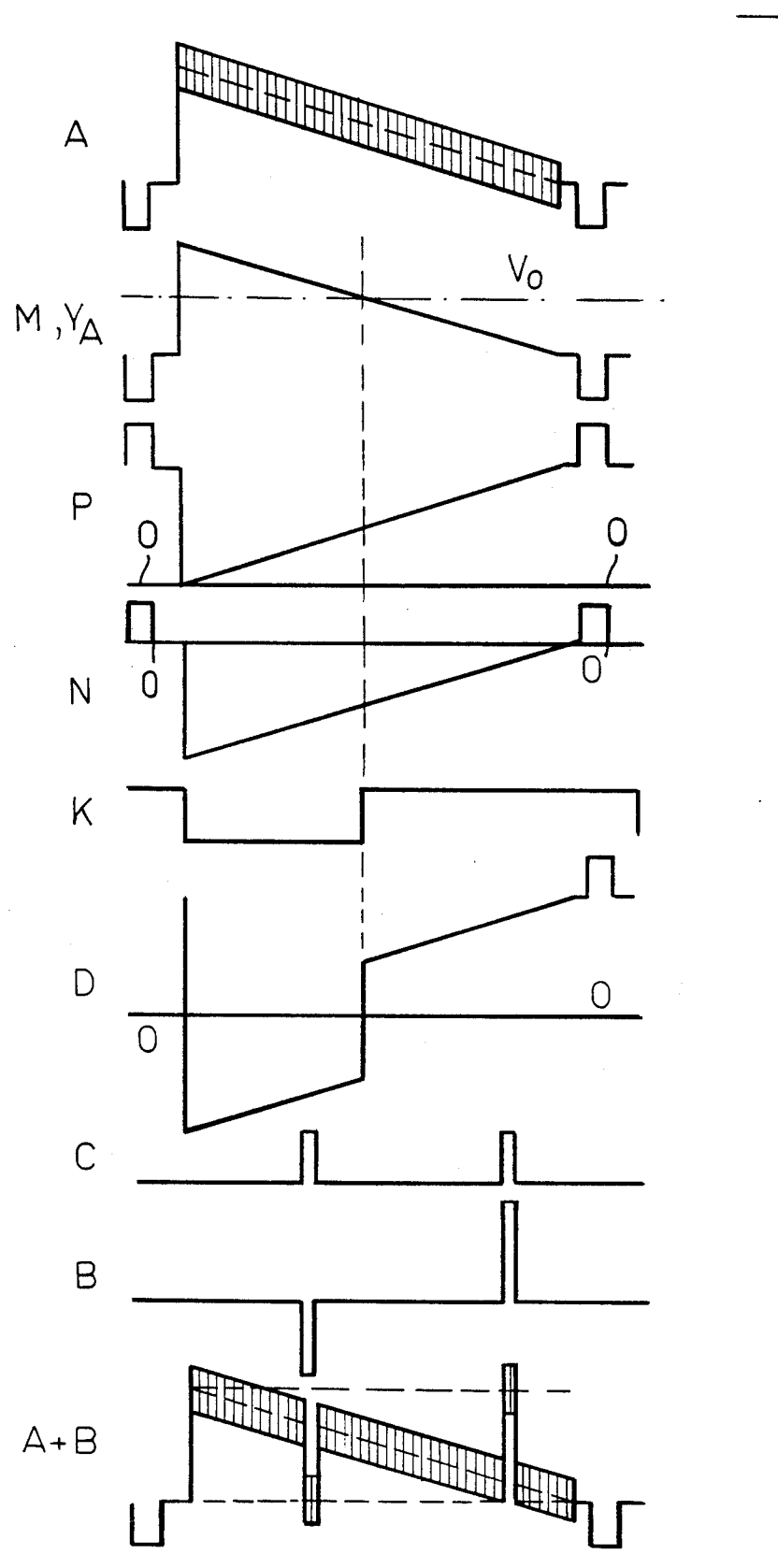
FIG. 9 is a timing diagram of the signals at different points of the, block diagram of FIG. 8.

As to FIG. 8 the symbol introduction into a television program signal is as follows:

Input signal A with restored DC level in the DC level fixation unit 3 is filtered as to the high frequency components, including the color signal, in the low-pass filter 12, to yield brightness signal YA appearing across its output (FIG. 9). The low-pass filter should guarantee sufficient cutoff rate, e.g. 1—17 dB/OCT or more, at a cutoff rate of about 3 MHz in order to obtain better suppression of the color signal dynamically changing by frequency band and the high frequency components of the brightness signal. Signal $Y_A$ in the DC level translator 24 is translated for medium brightness level, e.g. 50% to zero-M. The same translated signal M is compared by level to reference voltage $Y_o$, in comparator 22 which by its output state K controls the state of the first electronic switch 21. At the same time brightness signal $V_A$ is inverted across inverter 27, and its inverted values $\overline{V}_A$ are translated by DC level across DC level translators 25 and 26. Furthermore, the second DC level translator 25 translates the inverted brightness signal $V_A$ to zero for level white (100%), where the translated signal P across its output has only positive polarity. The third DC level translator 26 translates the inverted signal $\overline{V}_A$ to zero for level black (0%) where the translated signal N across its output has only negative polarity with the exception in the field of synchropulses which is of no significance for the function of the device. The two signals translated to zero for level white P and for level black N are reswitched from electronic switch 21 to its output, depending on the level of brightness signal $V_A$ and reference voltage $U_o$ of comparator 22. Signal D across the output of the first electronic switch 21, or across the first input of second switch 28, respectively, has negative polarity for brightness levels above the level of mating to comparator 22 15 and negative polarity for levels under the mating level. Furthermore, the mating level can be changed selectively by changing reference voltage $U_o$. The second electronic switch 28 is reswitched by the symbol pulse signals C where the second input of mixer 1 is raised from the zero potential and is simultaneously connected to signal D from the output of the first electronic switch 21. The signal has such polarity and level that in its additive mixing with the program signal across the output of mixer 1 signal A and B2 shall have level white or level black for the interval of the symbol C pulse, depending on the instantaneous value of the program signal brightness at the same time preserving the modulation brightness size.

It is possible to change the brightness level of the brightness inversion of the introduced symbols by operative reference voltage $U_o$ regulation in both directions towards the zero and this can optimize the symbol contrast in the picture, in accordance with the S-characteristic of vision.

It is possible to change the brightness of the introduced symbols with reduction (softening) contrast effect by shifting the levels of the DC level translators 25 and 26, for the second DC level translator 25 to negative value for level white, for the third DC level translator 26 to positive value for level black.

The device can also be applied for effective television image processing by using of another key signal C instead of a symbol generator which is a window of arbitrary shape in the interval of the active (visible) part of the program video signal. The end effect of such processing is a negative high contrast (with no half-tones) image.

Any narrowing of the frequency band of the brightness signal $V_A$ brings about differences in group time between the program signal A and the shaped signal of symbol B for additive mixing which is compensated by the inclusion of the time-levelling unit in the program signal A channel. The time-levelling acquires particular importance in symbol introduction on fine program signal A structure, especially in vertical orientation. In this case signal B has the same frequency structure and it is necessary, in summation, to be inserted by a phase opposite to the program signal. The exact insertion continues up to frequencies determined by the frequency band of a low-pass filter. For higher frequencies the phase signal B shifting towards the program signal A differs from 180° where no precision insertion of the two signals A and B occurs. As the spectral energy of the real video signals, the brightness spectral value respectively, is concentrated in the range up to 3MHz, this phenomenon is of no practical importance for the correction device function. In the limited frequency band of filter 12 around 3 MHz, the time-levelling unit 20 should have group time in the order of 200 ns.

No second low-pass filter is connected between the output of electronic switch 28 and the second input of mixer 1. The inclusion of such a filter for suppressing the high frequency components caused by the electronic switch commutation is 15 also possible in this case for preventing any cross distortions brightness/chromacity known as cross color. It is also desirable to limit the steepness of the wavefront of signals C and K, controlling electronic switches by their adequate shaping. This is of great importance for signals C controlling the second electronic switch 28 which may avoid the use of a second low-pass filter, or at least to use such a filter having a lower degree of high frequency suppression. This is advantageous for reducing the required group time of the time-levelling unit and the good compatibility of signals A and B2 in their mixture in mixer 1.

The device for symbol introduction in a television program signal operates in the same way both as a program signal for the PAL and NTSC quadrature systems and for SECAM eliminating any need for reswitching to its structure. For the SECAM system, in comparison with others, the device has the advantage that the program signal is not subjected to non-linear processes such as decoding/coding and frequency filtration.

A characteristic feature of the device for the introduction of symbols into a television program signal is the presence of current program signal color in the picture of the introduced symbols. The symbol coloring effect in the reproduced image can be neglected as the symbols are transmitted by maximum brightness, or by minimum brightness (less often statistically) where the addition or subtraction of brightness corresponds to shifting of local chromacity of the reproduced image to the center of the color locus MKO-white color, or its periphery-dark tone. This in reproduction has the effect of discoloring the symbols.

Figure 11:
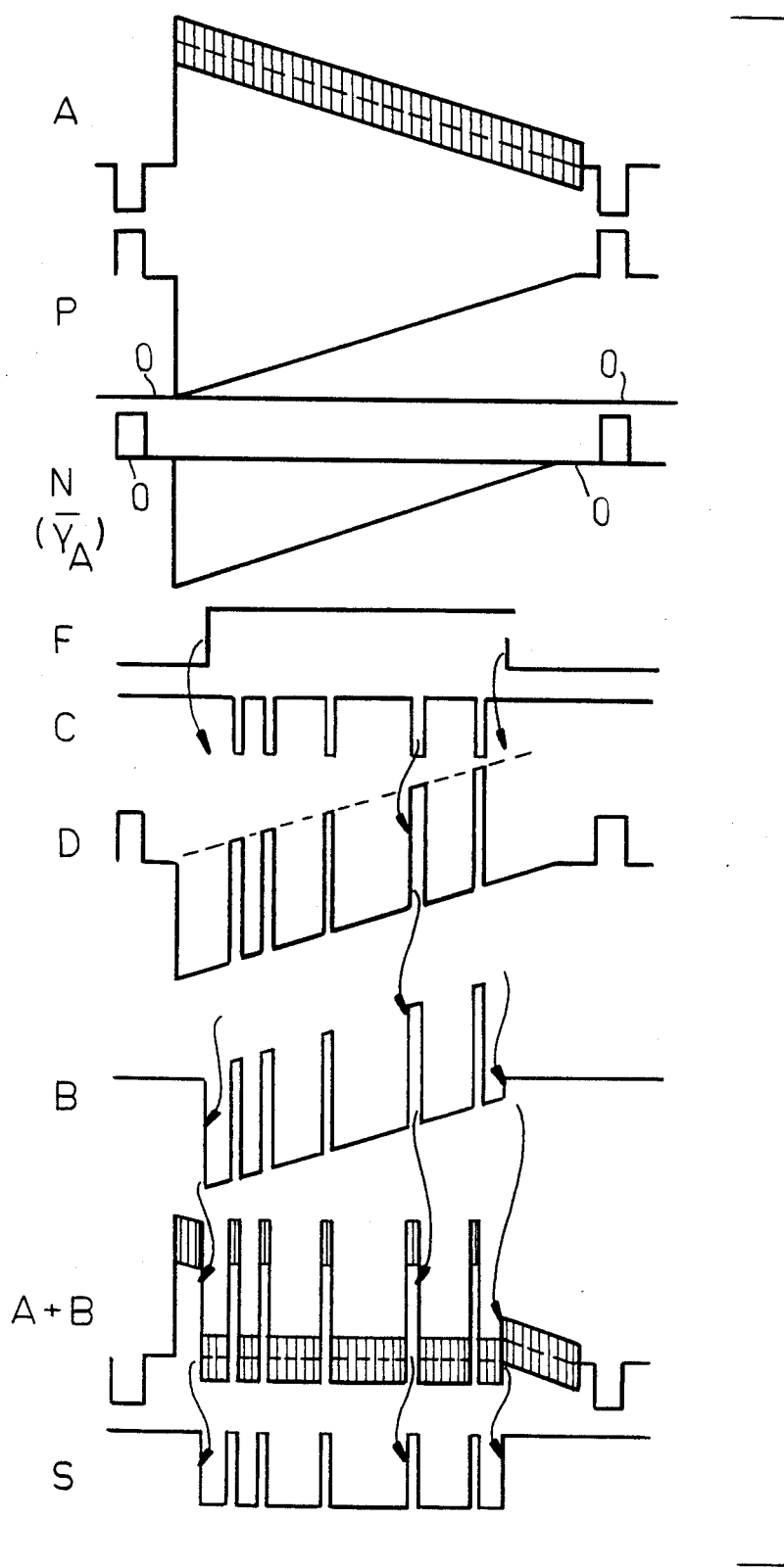
FIG. 11 is a set of timing diagrams describing t he operation of the device where the symbols of the respective signals are identical.

The subtitle device (FIG. 10) operates as follows:

The DC level of program signal A (FIG. 10) is fixed in the DC level fixation unit 3 and is fed for mixing across time-levelling unit 20 to the first input of additive mixer 1. The carrier for color together with the high frequency components of the brightness signal are eliminated in the low-pass filter 12. The produced brightness signal $Y_A$, inverted to $\overline{Y}_A$, (FIG. 11) in inverter 27 is translated to level white to zero level in translator 25, and thus, tied to the zero is fed to one of the inputs of the first electronic commutator 21. To the second input of the latter is supplied brightness signal N, tied to zero at level black and inverted, by means of translator 26. A key signal C1 is shaped from the complex signal for graphic information S containing a signal for background field and a signal of the symbols in the graphic symbol key signal shaper 30 for the first electronic switch 21, and key signal F is shaped in the background field key signal shaper 32 for the second electronic switch 28. When there is no signal for the symbol introduction across the output of the first switch 21, signal D1 repears the negative signal N-level black to zero, but the second switch 28 is connected across its output to zero potential so that an unchanged program signal is produced across the output of additive mixer 1. The background field signal F enables second switch 28 for the negative inverted brightness signal N -D1, B1 which, added to the program signal in mixer 1 gives level black across the output. The graphic symbols signal C reswitches the first switch to the inverted brightness signal of positive polarity P-level white to zero, so that signal B3 for the second input of mixer 1, added to program signal A produces level white across the output. Symbols of level white cut in on the level black background across the output.

It is possible to soften the background to gray by shifting the level of translator 26, or signal N, respectively, to positive direction. In a similar way the symbol brightnesses can be reduced by shifting signal P to negative levels. It is also possible to invert the field-symbols brightness by inverting the key signal of symbols C1 or exchange of signal connections P/M across the inputs of the first switch 21.

In case of separated-component signals for background field and for symbols, shapers 30, 32 are considerably simplified.

Figure 13:
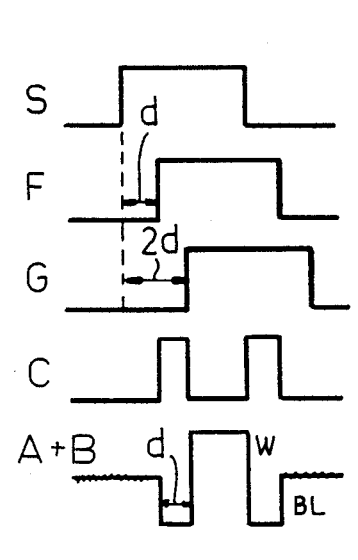
FIG. 13 is a signal diagram illustrating the functions of the units of FIG. 12.
Figure 15:
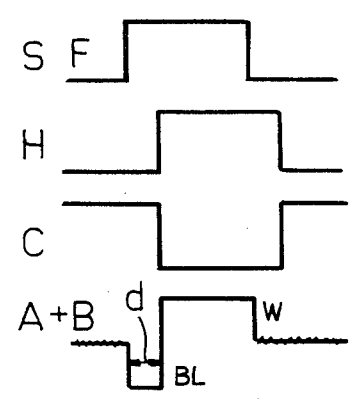
FIG. 15 is a set of diagrams illustrating the implementation of the units of FIG. 14.
Figure 16:
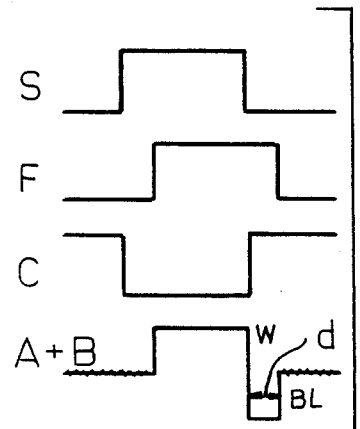
FIG. 16 is a signal diagram illustrating the operation of the units in FIG. 15.

The operation of the alternatives having different implementation of shapers 30, 32 (FIGS. 12, 13, 14, 15) is based on the contrast background symbol shaping-background framing, by the symbol signals. Key signals C1 are shaped from the symbol S signals for the first electronic switch 21, or F for the second one 28, respectively. As the diagrams of signals in FIGS. 13, 15, 16 illustrate, background contrast framing occurs in the interaction between the adequately controlled electronic switches 21 and 29, in accordance with the functional characteristics of the structure in FIG. 10, by three different ways: before and after the symbol line horizontally for the first alternative; before the symbol line for the second alternative; and after the symbol line for the third alternative.

Background framing of symbols in vertical image direction is achieved analogically and by analogical structures, but by using delay lines of time-delay of one, or two television lines, respectively. In a similar way combined background framing is achieved both horizontally and vertically.

Other logical or analogical structures (designs) of shapers 30 and 32 are also possible having the same end effect.

I claim:

1. An apparatus for introducing a symbol into a television program signal, comprising:

an adder having two inputs and an output for additively combining signals applied respectively to said inputs and delivering a summation signal at said output representing an output of said apparatus for a television program signal having a symbol incorporated therein;

a DC fixing unit having an input receiving a complex television program signal and an output;

a time leveling unit connecting said output of said DC fixing unit to one of said inputs of said adder;

a low-pass filter having an input connected to said output of said DC fixing unit and an output at which a signal representing instantaneous brightness $Y_A$ of said complex television program signal appears;

a symbol generator having an output;

a first DC level translator having an input connected to said output of said low-pass filter and an output;

a level comparator having two inputs and an output, one of said inputs of said comparator being connected to said output of said DC level translator, another of said inputs of said comparator receiving a reference voltage;

an inverter connected to said output of said low pass filter and having an output;

a second and a third DC level translator having respective inputs and outputs, said inputs of said second DC level translator and said third DC level translator being connected to said output of said inverter;

a first electronic switch having opposite polarity signal inputs respectively connected to said outputs of said second and third DC level translators and a control input connected to said output of said level comparator, said first electronic switch having an output; and a second electronic switch having a signal input connected to said output of said first electronic switch, a grounded second input, a control input connected to said output of aid symbol generator, and an output connected to the other input of said adder.

* * * * *